United States Patent [19]
Vanmoor

[11] Patent Number: 6,095,457
[45] Date of Patent: Aug. 1, 2000

[54] AIRFOIL AND WING CONFIGURATION

[76] Inventor: Arthur Vanmoor, 153 E. Palmetto Park Rd., Boca Raton, Fla. 33481

[21] Appl. No.: 09/210,978

[22] Filed: Dec. 14, 1998

[51] Int. Cl.$^7$ ....................................................... B64C 1/00
[52] U.S. Cl. ......................................... 244/123; 244/35 R
[58] Field of Search ................................. 244/123, 35 R, 244/35 A, 198, 45 R

[56] References Cited

U.S. PATENT DOCUMENTS

| | | | |
|---|---|---|---|
| 1,213,909 | 1/1917 | Russ | 244/123 |
| 4,641,796 | 2/1987 | Feifel | 244/123 |
| 5,395,071 | 3/1995 | Felix | 244/35 R |
| 5,839,700 | 11/1998 | Nedderman, Jr. | 244/123 |

*Primary Examiner*—J. Woodrow Eldred
*Attorney, Agent, or Firm*—Herbert L. Lerner; Laurence A. Greenberg; Werner H. Stemer

[57] ABSTRACT

A novel concept for a wing or airfoil incorporates the model of the natural wave behavior. The leading edge of the airfoil is parallel to the trailing edge, but offset by a given amplitude. The surfaces between the leading and trailing edges are rounded so as to promote proper fluid sheet formation along the surface and to reduce undesirable vortice formation. Best results are obtained by modeling the surfaces along a sine or tangent function.

15 Claims, 1 Drawing Sheet

AIRFOIL AND WING CONFIGURATION

BACKGROUND OF THE INVENTION

Field of the Invention

The invention lies in the field of fluid dynamics. In particular, the invention pertains to airfoil and wing designs.

The primary aerodynamic principle utilized in so-called heavier-than-air craft is the effect of the dynamic pressure of air acting on the craft as it is being propelled through the air. The dynamic pressure is proportional to the relative speed between the air and the aircraft. Crude air resistance acting on poor aerodynamic shapes translates into drag, which is defined as the force counteracting the forward thrust force of the aircraft. A certain amount of drag cannot be avoided. However, the drag force can be minimized by the proper design of airfoils and fuselage shapes. The object is to minimize drag and to maximize lift, i.e., to optimize the lift-to-drag ratio.

Early wing designs were based on the understanding that lift is obtained by a vertical force component acting upward, from below, on the wing. It was found that a thin plate with a very narrow attack surface and a slight downward curve (camber) provided a sufficient amount of lift. In other words, the pitch angle of the forward-most portion of the plate was approximately zero relative to the forward velocity vector of the translational movement of the aircraft and the wing had a downward curve by a few degrees. These types of wings were used in the early mono and biplanes. With the relatively low speeds of those early planes, the thin, slightly curved shape of the wing was acceptable. As the speeds increased, however, the lift-to-drag ratio very quickly deteriorated. The drag, it was found, was caused by the turbulent flow, i.e., the vortices or eddies, at the trailing edge of the wing.

In addition to the wing drag problem, the aerodynamic efficiency of an aircraft also includes factors such as the fuselage shape, all exposed surfaces, and other non-smooth protruding shapes. Drag is also affected by micro-friction between the exposed surfaces and the innermost layer (flow sheet) of the fluid impinging and being deflected by the surfaces. The total drag force on the aircraft is the sum of all drag vectors. The lift component, on the other hand, is largely provided only by the wings of the craft. This invention is primarily concerned with improving the lift-to-drag ratio of those structures.

Only after the early aircraft designers recognized that most of the lift on a wing in fact is due to the vacuum effect above the wing (the negative pressure compensates for the fluid compression forward of and below the wing)—the typical ratio is that approximately two-thirds of the lift originates from the upper vacuum effect and one-third is due to the compression below the wing—they started to more closely examine the upper surface of wing. This resulted in the development of the airfoil. The airfoil shape at first glance appears counter-intuitive. The airfoil has a thickened forward section which tapers to a very thin tip structure at the trailing edge. The basic airfoil design was further developed with a flap at the trailing edge, with which the early downward camber can be modeled. Also, a slot at the leading edge of the airfoil, which allowed a partial pressure below the wing to flow to the upper surface of the airfoil, was found to substantially reduce the formation of vortices and thus added drag forces.

The airfoil, with various developments and improvements within the basic principle, is currently the most-used wing shape of low to mid-speed (sub-Mach) aircraft.

These above-described principles concerning vortice creation and drag are similarly applicable to propellers and rotor blades. Furthermore, the principles concerning aircraft propellers are also extendible to watercraft. There, the eddie formation principles applicable to the relatively thin fluid air find their equivalents in the denser fluid water with the formation of eddie current vortices, cavitation, and supercavitation. Those structures are the subject of my copending applications (attorney docket Nos. F-7759 and F-7760), based on the same international priority application.

SUMMARY OF THE INVENTION

It is accordingly an object of the invention to provide a novel airfoil configuration, which further minimizes the above-mentioned disadvantages of the heretofore-known devices of this general type and which proposes a novel principle in airfoil and wing designs that maximizes the lift-to-drag ratio and aerodynamic efficiency of wings.

With the foregoing and other objects in view there is provided, in accordance with the invention, an airfoil configuration, comprising:

a wing structure having a leading edge, a trailing edge, an upper surface extending from the leading edge to the trailing edge, and a lower surface extending from the leading edge to the trailing edge;

the upper surface and the lower surface at the leading edge extending substantially parallel to and offset from the upper surface and the lower surface at the trailing edge.

In accordance with an added feature of the invention, the upper surface and the lower surface are defined by a function $y = \cos x$, where $0 \leq x \leq \pi$ in radians, x being approximately equal to zero at the leading edge and x being approximately equal to $\pi$ at the trailing edge. The rounding of the surfaces of the airfoil according to the natural wave behavior facilitates proper fluid sheet formation along the surfaces and substantially reduces the danger associated with the formation of vortices.

In accordance with an additional feature of the invention, the upper surface is defined by a function $y = (\cos x) + (\sin (x/z))$ and the lower surface is defined by a function $y = (\cos x) - (\sin (x/z))$, where $0 \leq x \leq \pi$ in radians, and $z > \pi$, x being approximately equal to zero at the leading edge and approximately equal to $\pi$ at the trailing edge. The sine component of this equation defines the thickness of the wing, i.e. the vertical spacing distance between the upper and lower surfaces along a chord line through the wing. The thickness can be similarly adjusted by defining each of the upper and lower surfaces with the "simple" sine function $y = \cos x$, but with a slight phase offset.

In accordance with another embodiment, z may be a constant or it may be a function of x and have a maximum value smaller than a maximum value of x.

In accordance with a further feature of the invention, the upper surface and the lower surface are defined by a function $y = a \cos x$, where $0 \leq x \leq \pi$ in radians. Here, x approaches zero at the leading edge and it approaches $\pi$ at the trailing edge. The variable a is a real number. This feature may be referred to as "smoothing" or "softening" the curve, which is achieved by varying the amplitude of the function. The component a may be constant or it may be a function of x, with a maximum weighted value smaller than a maximum value of the variable x.

In accordance with an alternative embodiment, the upper surface and the lower surface are defined by a tangent function. The leading and trailing edges, thereby, are parallel to one another only in the limits of the function.

In accordance with again a further embodiment of the invention, the offset between the leading edge and the trailing edge increases with a distance from a point of attachment of the wing structure. This may be modeled by defining the upper surface and the lower surface by a function y=d cos x, where $0 \leq x \leq \pi$ in radians, x approaches zero at the leading edge and approaches π at the trailing edge. The component d is proportional to the distance from the point of attachment (the fuselage) of the wing structure and assumes a maximum of no more than 1.

Other features which are considered as characteristic for the invention are set forth in the appended claims.

Although the invention is illustrated and described herein as embodied in an airfoil and wing configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
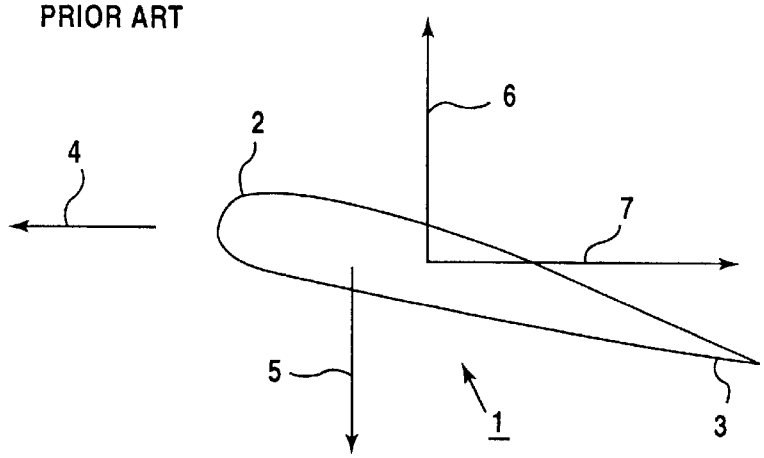
FIG. 1 is a section taken through a prior art airfoil structure.

Referring now to the figures of the drawing in detail and first, particularly, to FIG. 1 thereof, there is seen a basic airfoil configuration. The airfoil 1 has a thickened, rounded leading edge 2 and a wedge-shaped trailing edge 3. The forward movement of the wing—relative to the air—is indicated by a velocity vector 4. It is noted, in this regard, that the various effective vectors illustrated in the figures are not drawn to scale. The airfoil is subject to a vertically downward weight vector 5. The lift-to-drag ratio is defined by the ratio of a lift vector 6 to a drag vector 7. In the basic model, the aircraft is in equilibrium flight—the airspeed and altitude remain constant—when the value of the weight vector 5 equals the value of the lift vector 6 (equal and opposite forces cancel each other in zero acceleration), and the drag vector 7 is offset by the forward thrust of the propulsion system (e.g. propeller or turbine).

A considerable drawback associated with conventional airfoils becomes evident from a close review of the vectors 5 and 6. The forward motion of the wing relative to the supporting medium (air) and the resultant distribution of the upward partial pressures place the resultant lift vector 6 behind the center of gravity, at which the weight vector 5 attaches. The result is a pitch torque defined by the values of the vectors 5 and 6 and the distance of their respective points of origin. This torque is referred to as fore-and-aft instability, which tends to force the aircraft nose downward and the tail upward. The pitch torque must be carefully balanced, which is typically achieved with flaps, such as elevators, at the rear of the fuselage. It will be seen from the following description, that the inventive concept substantially reduces the pitch torque effects and thus provides a savings in terms of compensating measures.

Figure 2:
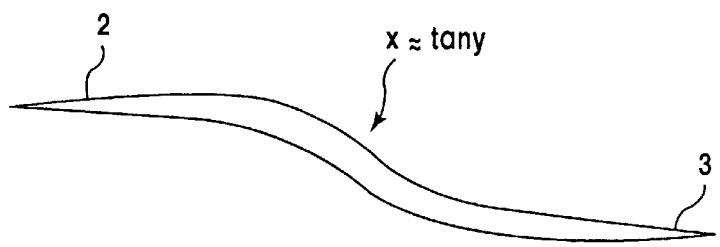
FIG. 2 is a section taken through an airfoil or wing according to the invention.
Figure 3:
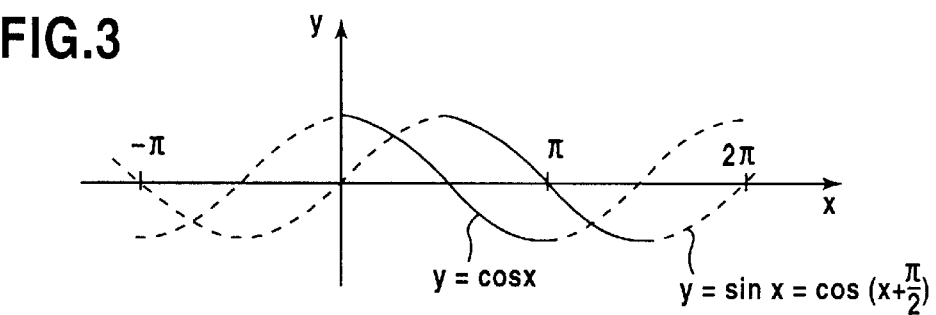
FIG. 3 shows a plot of a sine and cosine function as applied to the invention.

Referring now to FIGS. 2 and 3, the airfoil according to the invention has a cross-sectional shape that may be modeled as a sinusoidal curve shape. The upper and lower surfaces of the novel airfoil very nearly follow a sine wave, from cos 0 to cos π (in radians), which is equivalent to the curve from sin ½π to sin 1.5π. In other words, the surfaces approximate the function:

$$y=\cos x, \text{ where } 0 \leq x \leq \pi \text{ (rad)}. \qquad (1)$$

The darkened segments in FIG. 3 are representative of the function segment in equation (1).

In the illustrated embodiment it is evident that the upper and lower surfaces do not quite follow the exactly equal functions. This is due to the added structural support provided at the center of the novel airfoil. The thickened configuration may be modeled by the following modification of equation (1):

$$y=(\cos x) \pm (\sin (x/z)) \qquad (2)$$

where $0 \leq x \leq \pi$, and $z > \pi$. The upper curve is obtained by adding the sine component (the + in the ± applies) and the lower curve is modeled by substracting the sine component (the − in the ± applies) from equation (1). The thickness is adjusted with the z component, which may be a constant (z>π) or a function of x (z=f(x)), whose maximum value is smaller than the maximum value of x.

Figure 4:
FIG. 4 is a plot of two sine functions which are offset from one another by a certain phase angle defining a thickness of the airfoil or wing according to the invention.

As shown in FIG. 4, a very similar structural thickness of the wing is obtained by simply offsetting the upper curve from the lower curve by a phase difference relative to the lower curve. For instance, the lower curve would then be represented by y=cos x and the upper curve by y=cos (x+z) with z being a constant somewhere between 0.2 and 0.5 or a function of x.

Furthermore, the curvature of the surfaces may be "softened" by reducing the amplitude of the function. Accordingly, equation (1) would be modified as follows:

$$y=a \cos x \qquad (3)$$

where $0 \leq x \leq x$, and a=constant or a=f(x). Combining equation (3) with equation (2), the following modification results:

$$y=a \cos x \pm (\sin (x/z)) \qquad (4)$$

In an alternative embodiment, the airfoil shape may be modeled as a tangent function, y=tan x=sin x/cos x. Here, however, the axes y and x are rotated counter-clockwise by 90° as compared to the illustration in FIG. 3.

Another important consideration in aircraft wing design is the planform of the wing. The planform is the shape and size as viewed from above or below in a direction substantially transverse to the direction of flight, and is expressed in the aspect ratio and the wing outline. The aspect ratio is the ratio between the wing span (length of the wing) and the chord (length of a straight line from the leading edge to the trailing edge of the wing). The pressure distribution on the wing, and thus also the lift-to-drag ratio, varies with the aspect ratio. A rule of thumb is that low aspect ratios ($\leq 3:1$) are used for faster airplanes while high aspect ratios (>10:1) are used for slow long-range airplanes.

It is further advantageous to introduce a further variable in the shape function, namely a variable representing the distance of the specific wing chord from the fuselage. In terms of the above equations, the variable may thereby appear in the variable a (amplitude) or in the variables z (thickness). For example, the amplitude of the curve may increase with the distance from the fuselage and with the attendant shortening of the wing chord. For example, equation (3) would become:

$$y = d \cos x \qquad (5)$$

where $0 \leq x \leq \pi$, and d is the distance from the fuselage. The value of d is weighted so that $0 \leq d \leq 1$. At d=0 (directly at the fuselage), the function becomes y=0 and the curve vanishes to a straight line. At d=1 (at the point of maximum wing curvature), the curve has its full amplitude expressed by equation (1).

I claim:

1. An airfoil and wing configuration, comprising:
   a wing structure having a leading edge, a trailing edge, an upper surface extending from said leading edge to said trailing edge, and a lower surface extending from said leading edge to said trailing edge;
   said upper surface and said lower surface at said leading edge extending substantially parallel to and offset from said upper surface and said lower surface at said trailing edge.

2. The airfoil and wing configuration according to claim 1, wherein said upper surface and said lower surface are defined by a function y=cos x, where $0 \leq x \leq \pi$ in radians, x being approximately equal to zero at said leading edge and x being approximately equal to $\pi$ at said trailing edge.

3. The airfoil and wing configuration according to claim 1, wherein said upper surface is defined by a function y=(cos x)+(sin (x/z)) and said lower surface is defined by a function y=(cos x)−(sin (x/z)), where $0 \leq x \leq \pi$ in radians, and z>$\pi$, x being approximately equal to zero at said leading edge and approximately equal to $\pi$ at said trailing edge.

4. The airfoil and wing configuration according to claim 3, wherein z is a constant.

5. The airfoil and wing configuration according to claim 3, wherein z is a function of x and has a maximum value smaller than a maximum value of x.

6. The airfoil and wing configuration according to claim 1, wherein said upper surface and said lower surface are defined by a function y=a cos x, where $0 \leq x \leq \pi$ in radians, x being approximately equal to zero at said leading edge and x being approximately equal to $\pi$ at said trailing edge, and a is a real number.

7. The airfoil and wing configuration according to claim 6, wherein a is a constant.

8. The airfoil and wing configuration according to claim 6, wherein a is a function of x and has a maximum value smaller than a maximum value of x.

9. The airfoil and wing configuration according to claim 1, wherein said upper surface and said lower surface are defined by a tangent function.

10. The airfoil and wing configuration according to claim 1, wherein the offset between said leading edge and said trailing edge increases with a distance from a point of attachment of said wing structure.

11. The airfoil and wing configuration according to claim 10, wherein said upper surface and said lower surface are defined by a function y=d cos x, where $0 \leq x \leq \pi$ in radians, x being approximately equal to zero at said leading edge and approximately equal to $\pi$ at said trailing edge, and wherein d is proportional to the distance from the point of attachment of said wing structure and assumes a maximum of no more than 1.

12. The airfoil and wing configuration according to claim 1, wherein said lower surface is defined by a function y=a cos x and said upper surface is defined by a function y=a cos (x+z), where $0 \leq x \leq \pi$ in radians, x being approximately equal to zero at said leading edge and x being approximately equal to $\pi$ at said trailing edge, and a and z are real numbers.

13. The airfoil and wing configuration according to claim 12, wherein a and z are each constant.

14. The airfoil and wing configuration according to claim 12, wherein a is a function of x and has a maximum value smaller than a maximum value of x.

15. The airfoil and wing configuration according to claim 12, wherein z is a function of x and has a maximum value smaller than a maximum value of x.

* * * * *